United States Patent [19]

Jacobson

[11] 4,226,359
[45] Oct. 7, 1980

[54] DIRECT DRIVE HIGH SPEED ULTRACENTRIFUGE

[75] Inventor: Kenneth E. Jacobson, Fremont, Calif.

[73] Assignee: Beckman Instruments, Inc., Fullerton, Calif.

[21] Appl. No.: 20,387

[22] Filed: Mar. 14, 1979

[51] Int. Cl.³ .............................................. B04B 9/04
[52] U.S. Cl. .................................................... 233/24
[58] Field of Search .............. 233/1 A, 23 R, 24, 1 R, 233/13, 27, 23 A

[56] References Cited

U.S. PATENT DOCUMENTS

| | | |
|---|---|---|
| 770,385 | 9/1904 | Pott . |
| 2,171,749 | 9/1939 | Hollander . |
| 2,936,110 | 5/1960 | Cohen .................................... 233/46 |
| 3,218,490 | 11/1965 | Eis . |
| 3,289,925 | 12/1966 | Zippe .................................... 233/24 |
| 3,304,990 | 2/1967 | Ontko .................................... 233/26 |
| 3,674,196 | 7/1972 | Gutter . |
| 3,676,723 | 7/1972 | Drucker . |
| 3,804,324 | 4/1974 | Sinn ....................................... 233/24 |
| 4,010,893 | 3/1977 | Smith ..................................... 233/24 |
| 4,018,304 | 4/1977 | Lolachi . |

OTHER PUBLICATIONS

News and Comment on Centrifuging, Measuring and Scientific Equipment Co., London, England, vol. 1, No. 1, Jul. 1966.

*Primary Examiner*—Robert W. Jenkins
*Attorney, Agent, or Firm*—Robert J. Steinmeyer; Ferd L. Mehlhoff; William H. May

[57] ABSTRACT

A direct drive system for a high speed ultracentrifuge. The drive spindle assembly is removable through the rotor chamber without disturbing any vacuum seals that are present to isolate the requisite vacuum environment in the rotor chamber for high speed rotation. All of the high speed bearings are connected to the spindle assembly for removal as a unit. An induction motor provides the direct drive with the motor armature mounted on the drive spindle assembly.

8 Claims, 2 Drawing Figures

4,226,359

DIRECT DRIVE HIGH SPEED ULTRACENTRIFUGE

BACKGROUND OF THE INVENTION

The present invention is directed to a drive system for an ultracentrifuge and, more particularly, discloses a direct drive system for a high speed ultracentrifuge with an easily removable drive spindle unit with high speed bearings.

Typical drive systems for high speed ultracentrifuges are gear drive systems. Consequently, when it is necessary to repair the drive system, the removal of the entire gear train and drive assembly is necessary. Also, in high speed ultracentrifugation the chamber in which the rotor operates must have a vacuum environment in order to reduce the wind friction which otherwise would occur with the high speed rotation of the rotor in an air environment. Vacuum seals are required within the drive system in order to maintain the vacuum of the rotor chamber. These vacuum seals are normally found on the rotor shaft and are susceptible to continual wear requiring periodic replacement. Also, whenever it is necessary to remove the drive system for repair, the vacuum seals on the shaft must be replaced. The typical electric motors used in the gear drive ultracentrifuge systems have motor brushes which are also a source of wear and must be replaced periodically, requiring service of the motor. Again, this requires a major effort in the removal of the drive system for this maintenance function.

Some systems utilize an oil turbine drive system which is a direct drive system, but also requires a significant amount of maintenance. The spindle is connected to a turbine which receives oil within a compartment to rotate the spindle.

Although induction motors have been used to directly drive centrifuge spindles for rotors, the configuration of these centrifuges does not permit efficient and convenient repair and replacement of the worn parts. The spindle is not easily removable and the bearings are not connected to the spindle so that a significant effort is required to replace them.

In nearly all drive systems for high speed ultracentrifuges it is necessary to periodically maintain the drive assemblies to replace various parts which are susceptible to wear due to the high speed rotation of the drive spindle. Consequently, it is a paramount desire of designers and manufacturers of high speed ultracentrifuges to provide a system which will be conducive to relatively low and/or simplified maintenance functions.

SUMMARY OF THE INVENTION

The present ultracentrifuge drive system directly drives a compact drive spindle and high speed bearing unit which is easily removed without affecting vacuum seals in the overall drive system. Not only is the rotor chamber subjected to a vacuum environment, but also the drive assembly portion of the centrifuge is isolated as part of the general vacuum environment of the rotor chamber so that the vacuum seals are remote from the drive spindle and overall drive assembly. Consequently, removal of the drive assembly for maintenance will not necessitate removal of any vacuum seals.

The drive assembly utilizes an induction motor wherein the armature of the motor is connected to the drive spindle for the centrifuge rotor to provide a direct drive system. The direct drive system provides for more efficient operation of the rotor and allows greater maximum speed. The high speed bearings are connected on the drive spindle and are removable along with the drive spindle and the motor armature as a single unit, providing an efficient and easy method of replacing the main portion of the drive system. The use of the induction motor eliminates the presence of motor brushes on the typical electric motors used in a gear drive system.

Since the high speed bearings are the typical source of failure in the drive system, the present invention incorporates the bearings as part of the removable drive unit containing the spindle so that maintenance of the bearings is greatly simplified. It is envisioned that the present invention will allow for the replacement of the high speed running gear and spindle by the instrument user rather than necessitating a special maintenance visit by a service person.

DETAILED DESCRIPTION OF THE INVENTION

Figure 1:
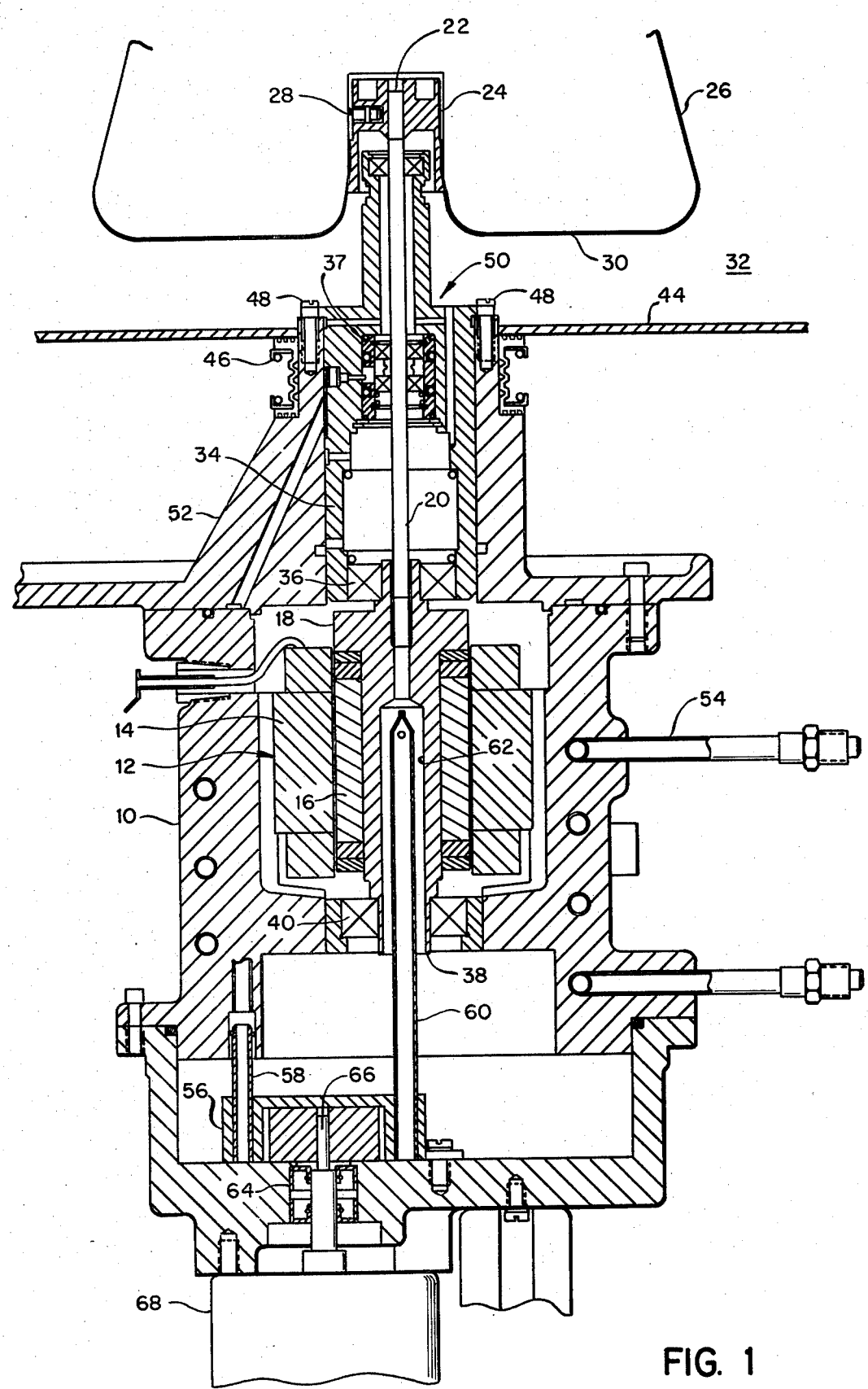
FIG. 1 is a sectional view of the overall drive arrangement for a high speed ultracentrifuge.

Reference is made to FIG. 1 showing a lower housing 10 for an induction motor 12 having a stator portion 14 and an armature portion 16. The armature 16 is mounted on an armature shaft 18 which is connected to a drive spindle 20. At the upper portion 22 of the drive spindle 20 is a hub assembly 24 which is designed to fit within a recessed area 28 in the bottom 30 of a rotor 26. The rotor is located in the centrifuge vacuum chamber 32.

Located between the armature shaft 18 and the hub assembly 24 is an upper bearing housing 34 which contains an upper high speed bearing 36 as well as a damper bearing assembly 37. A lower high speed bearing 40 is connected to the armature shaft 18. The bottom plate 44 of the vacuum chamber 32 provides the barrier between the overall drive assembly and the vacuum chamber. The vacuum environment of the rotor chamber is very important to the operation of an ultracentrifuge, because the high speed of the rotor during operation requires an air free environment to eliminate air friction. A flexible vacuum seal 46 is used between the rotor chamber and the drive assembly.

The induction motor or lower housing 10 is cooled by a heat transfer medium being circulated through the cooling coil 54 that is mounted within the housing wall. The lubrication of the system is accomplished by the use of a lubrication or oil pump 56. Conduit 58 supplies a lubricating medium or oil to the damper bearing assembly 37 as well as the upper and lower high speed bearings 36 and 40. A central cooling tube 60 is coaxial with an elongated aperture 62 within the armature 18 to supply lubricating oil for cooling the armature of the induction motor. The overall cooling system is explained in more detail in copending application entitled A Lubrication and Cooling System for a High Speed Ultracentrifuge Drive Assembly.

A vacuum seal 64 is included for the drive shaft 66 of the oil pump 56 which is driven by the oil pump motor 68. Because the motor 68 operates at a relatively low speed of approximately 50 to 60 r.p.m., the seal will maintain its integrity for a considerable period of time as opposed to prior art arrangements which place the vacuum seals on the drive spindle which, in some cases, operates at 50 to 60,000 r.p.m.'s. The present ultracentrifuge drive spindle is designed for operational speeds as high as 80,000 r.p.m.'s.

The screws 48 hold the overall spindle assembly 50 securely in place. The removal of the screws 48 permits the extraction of the spindle 20 as well as the upper bearing housing 34 and the armature shaft 18 with the respective upper and lower high speed bearings 36 and 40. The damper assembly bearing 42, being attached to the upper bearing housing 34, and the induction motor armature 16, being attached to the armature shaft 18, are both removable as part of the overall removable spindle assembly 50. The removal of the spindle assembly 50 will not affect the vacuum seals 46 and 64 which isolate the rotor chamber 32 and the interior of the motor housing 10 and the drive mount plate housing 52 or spindle housing.

Figure 2:
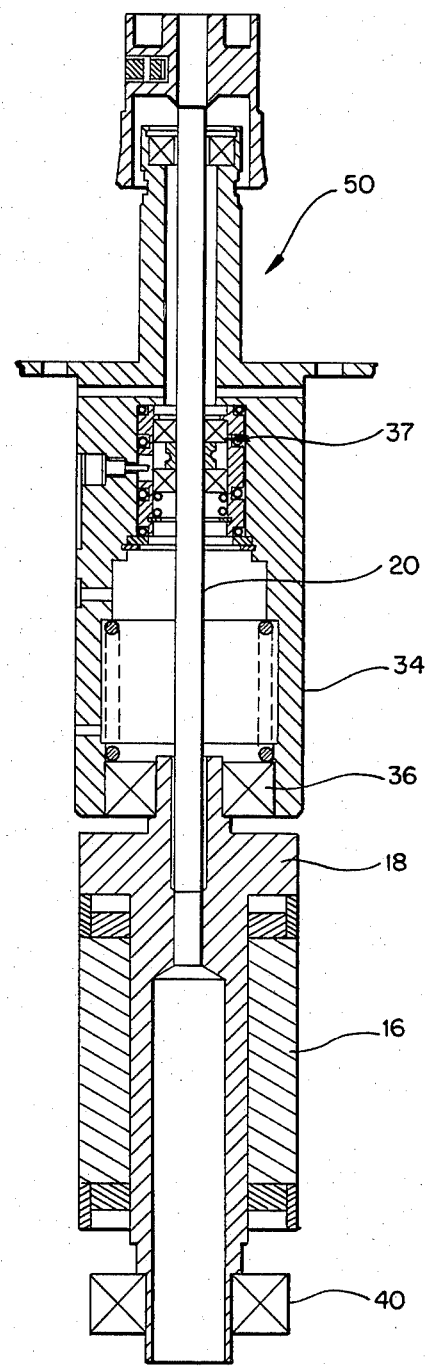
FIG. 2 is a sectional view of the removed drive spindle assembly unit.

In FIG. 2 the removable spindle assembly 50 is shown separated from the centrifuge. The entire spindle assembly which includes the spindle 20 with the armature shaft 18 and high speed bearing 40 is removable together as a unit with the upper bearing housing 34 and the upper high speed bearing 36. Also included in one removable unit is the armature 16 of the induction motor 12 in FIG. 1 as well as the damper bearing assembly 37.

The rotative part of the spindle assembly includes the spindle 20 and hub assembly 24 which interfaces with the rotor 26 in FIG. 1. The rotatable spindle is rotatably supported within the stationary upper bearing housing 34 by the damper bearing assembly 37 and upper high speed bearing 36. The spindle is connected to the armature shaft 18 in such a manner that the spindle 20 will rotate with the armature shaft 18. Attached to the armature shaft 18 is the armature 16 of the induction motor which will be rotated by the stator 12 of the motor in FIG. 1 when the stator is energized. The rotation of the armature 16 by the stator 12 imparts rotation to the spindle 20 to directly drive the rotor 26. The lower high speed bearing 40 essentially provides the entire support for the spindle assembly 50 as well as the rotor 26. As stated previously, an elongated central cavity 62 is located within the armature shaft 18 to establish a cooling area for the high speed rotation of the armature 16.

The most significant maintenance areas of presently used high speed ultracentrifuges are the motor brushes, the vacuum seals and the bearings. The present invention is designed to not only provide for the alleviation of the wear problem on the seals because they are not on the spindle, but also eliminate motor brushes because the system uses an induction motor. This invention allows for the easy removal of the bearings which are susceptible wear and limited life. More particularly, since the high speed bearings are placed on the spindle as a single unit 50 for efficient removal through the bottom plate 44 of the rotor chamber 32, the maintenance time required is very minimal. The entire unit 50 is designed for simple removal and replacement with a new unit. The removed unit can be repaired at a later time in the factory. Also, the present invention places the vacuum seals away from the high speed spindle, so that the wear of the seals is alleviated.

As shown in FIG. 1, once the spindle assembly 50 has been placed within the drive mount plate housing 52 as well as within the induction motor housing 10, the armature 16 is in operational placement with the stator 14.

Once the induction motor 12 is activated, the armature will spin and directly drive the spindle 20 to rotate the rotor 26 which is connected through the hub assembly 24 to the spindle 20. Because it is a direct drive system, there are no losses through a gear train type of system. Further, the typical electrical motors used in the gear train type of drive system have brushes which will eventually wear. Also, these motors having brushes must operate in an air environment. In the induction motor there are no brushes susceptible to wear and failure and the motor can be operated in a vacuum environment.

The overall removable spindle assembly 50 of the present invention is designed in one embodiment to be less than three pounds and have a two inch diameter with a length of approximately 14 inches. The drive is rated to operate at a maximum speed of 80,000 r.p.m. The light weight and small size is important with respect to repair and transportation of the unit. Presently, the gear drive type drive systems of similar ultracentrifuges weigh approximately 40 to 60 pounds and are very bulky, requiring considerable time to remove and replace.

It is envisioned that the present invention could be directed to other specific embodiments wherein a direct drive system using an induction motor can be utilized for a high speed ultracentrifuge. More specifically, the direct drive system can be made in such a manner similar as shown in these figures to provide for the removable spindle assembly with the high speed running gear in such a manner that the vacuum seals are not disturbed.

What is claimed is:
1. A high speed ultracentrifuge comprising:
a rotor chamber for receipt of a rotor;
a drive assembly in driving communication with said rotor within said rotor chamber;
a housing adjacent said rotor chamber for receipt of said drive assembly, said rotor chamber and said housing being subjected to a vacuum environment when said ultracentrifuge is operating;
a drive spindle mounted within said drive assembly;
bearing means mounted on said spindle, said bearing means and said spindle forming a removable unit from said housing and said chamber; and
vacuum seals mounted adjacent said housing remote from said spindle so that said extraction of said removable unit of said spindle and bearing means will not disturb said vacuum seals.

2. A high speed ultracentrifuge as defined in claim 1, wherein said drive assembly comprises an electrical induction motor having an armature and a stator, said armature connected to said spindle so that said armature is part of said removable unit.

3. A high speed ultracentrifuge having a rotor chamber in vacuum communication with a spindle housing from which a removable spindle assembly projects for driving communication with the interior of said chamber, said removable spindle assembly comprising:
a drive spindle;
bearing means mounted on said spindle;
an induction motor armature connected in coaxial relation to said spindle; and
a hub assembly for receipt of a rotor within said chamber.

4. A high speed ultracentrifuge comprising:
a rotor chamber;
a spindle housing adjacent said chamber;

a removable drive spindle mounted in said spindle housing and extending into said chamber;

bearing means mounted on said spindle;

an induction motor in driving communication with said spindle and having an armature and a stator, said armature being fixed to said spindle to directly drive said spindle, said drive spindle, said bearing means and said armature being connected together in such a manner so as to permit their removal as a unit from said spindle housing and said motor stator, said spindle housing and said motor stator being fixed within said centrifuge.

5. A high speed ultracentrifuge comprising:

a rotor chamber;

a drive spindle with its upper portion being within said rotor chamber for driving communication with a rotor within said chamber;

a housing adjacent said rotor chamber for receipt of said drive spindle;

means for directly driving said spindle; and bearing means mounted on said spindle for high speed rotation, said drive spindle and said bearing means being connected together in such a manner so as to permit removal of said drive spindle and bearing means as a unit from said housing and said driving means.

6. A high speed ultracentrifuge comprising:

rotor chamber having a vacuum environment during operation of said centrifuge;

a drive housing adjacent said chamber;

a drive shaft in driving communication with the interior of said chamber;

high speed bearings mounted on said shaft, said bearings and said shaft being connected to form a separate high speed rotating components unit;

means mounted on said drive shaft for directly driving said shaft; and vacuum seals on said drive housing and remote from said high speed components unit, said unit being removable from said drive housing without disturbing said vacuum seals.

7. A high speed ultracentrifuge comprising:

rotor chamber;

a spindle housing mounted adjacent said chamber;

a drive spindle assembly positioned within said spindle housing and in driving communication with said chamber;

means for creating a vacuum environment within said chamber and within said spindle housing;

vacuum sealing means for said spindle housing;

means for directly driving said spindle; and bearing means on said spindle, said spindle and said bearing means and at least a portion of said driving means being removable as a spindle unit from said spindle housing, removal of said spindle unit not disturbing said vacuum sealing means.

8. A high speed ultracentrifuge comprising:

a rotor chamber;

a drive spindle in driving communication with the interior of said chamber;

an upper bearing housing for rotative support of the upper portion of said spindle;

an armature shaft connected to said spindle for rotative movement with said spindle;

bearing means within said upper bearing housing and said armature shaft;

an induction motor armature connected to said armature shaft;

a housing for said spindle;

an induction motor stator mounted within said housing and in operative relation with said armature;

means for creating a vacuum within said chamber and said housing; and vacuum sealing means for said housing, said spindle with said upper bearing housing, said armature shaft, said bearing means, and said armature being removable as a unit from said housing through said chamber without affecting the integrity of said vacuum sealing means.

* * * * *